US010648640B2

(12) United States Patent
Hemon et al.

(10) Patent No.: US 10,648,640 B2
(45) Date of Patent: May 12, 2020

(54) LIGHT EMITTING DIODE (LED) PAD MOUNT SYSTEM

(71) Applicant: Valeo North America, Inc., Troy, MI (US)

(72) Inventors: Julien Hemon, Columbus, IN (US); Fred Roth, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 124 days.

(21) Appl. No.: 15/465,018

(22) Filed: Mar. 21, 2017

(65) Prior Publication Data

US 2018/0274748 A1 Sep. 27, 2018

(51) Int. Cl.

| | | |
|---|---|---|
| F21V 9/00 | (2018.01) |
| F21S 45/47 | (2018.01) |
| F21V 29/89 | (2015.01) |
| F21V 17/00 | (2006.01) |
| F21S 41/29 | (2018.01) |
| F21S 41/24 | (2018.01) |
| F21V 23/00 | (2015.01) |
| F21V 29/70 | (2015.01) |
| F21S 41/32 | (2018.01) |
| F21S 41/143 | (2018.01) |
| F21S 41/19 | (2018.01) |
| F21V 8/00 | (2006.01) |
| F21V 5/04 | (2006.01) |
| F21Y 115/10 | (2016.01) |

(52) U.S. Cl.
CPC ............. *F21S 45/47* (2018.01); *F21S 41/143* (2018.01); *F21S 41/19* (2018.01); *F21S 41/24* (2018.01); *F21S 41/29* (2018.01); *F21S 41/322* (2018.01); *F21V 17/005* (2013.01); *F21V 23/006* (2013.01); *F21V 29/70* (2015.01); *F21V 29/89* (2015.01); *G02B 6/0006* (2013.01); *F21V 5/04* (2013.01); *F21Y 2115/10* (2016.08)

(58) Field of Classification Search
CPC ........ F21S 45/47; F21V 29/70; F21V 23/006; F21V 17/005; F21V 29/89; F21V 5/04; G02B 6/0096; F21Y 2115/10
USPC .......... 362/235, 249.01, 294, 310, 373, 374, 362/375, 376
See application file for complete search history.

(56) References Cited

U.S. PATENT DOCUMENTS

| | | |
|---|---|---|
| 2003/0189828 A1 | 10/2003 | Coushaine |
| 2004/0264195 A1* | 12/2004 | Chang ................ F21K 9/00 362/294 |
| 2005/0135105 A1 | 6/2005 | Teixeira et al. |
| 2009/0170361 A1* | 7/2009 | Daily ................. F21K 9/00 439/345 |

(Continued)

FOREIGN PATENT DOCUMENTS

FR 3 030 685 A1 6/2016

*Primary Examiner* — William J Carter
*Assistant Examiner* — Omar Rojas Cadima
(74) *Attorney, Agent, or Firm* — Oblon, McClelland, Maier & Neustadt, L.L.P.

(57) ABSTRACT

A lighting assembly includes a heat sink including a pad surface, and an LED mounted on the pad surface. An optical device is optically coupled to the LED, and a support structure is provided for connecting the optical device to the heat sink. The support structure includes fixation spacers to connect the supporting structure to the heat sink, and both the LED and the fixation spacers contact the pad surface on a common plane.

19 Claims, 5 Drawing Sheets

(56) References Cited

U.S. PATENT DOCUMENTS

| | | | |
|---|---|---|---|
| 2011/0037091 A1* | 2/2011 | Fushimi | H01L 33/486 257/98 |
| 2011/0194270 A1* | 8/2011 | Di Trapani | F21V 9/30 362/2 |
| 2013/0193850 A1* | 8/2013 | Demuynck | F21V 23/006 315/113 |
| 2016/0190418 A1* | 6/2016 | Inomata | H01L 33/644 257/98 |

\* cited by examiner

LIGHT EMITTING DIODE (LED) PAD MOUNT SYSTEM

BACKGROUND

Field of the Disclosure

The present disclosure is directed toward a heatsink and mounting pad for a motor vehicle lighting system and method.

Description of the Related Art

Use of semiconductor-based (e.g., LED) lighting in vehicles is increasingly common in the automotive industry. As volumes have grown, auto manufacturers and their suppliers are under increasing pressure to continue to improve performance and efficiency, and to reduce weight and costs as LED lighting assemblies are installed on an increasingly large number of vehicles, including those of modest, sensitive price points.

Areas for development include alignment and precision of the LED projection, thermal management, reliability and durability, ease and quality of manufacturing, and reduced labor and material costs. Thus, continued innovation and refinement of materials and manufacturing processes are important contributors toward the introduction of improved LED-based lighting.

As power outputs of LEDs increase, there is a need to use of a heat sink to dissipate heat. However, the heat sink is large compared to the LED and makes alignment with optical elements difficult.

SUMMARY

The present disclosure is directed to a lighting assembly including a heat sink having a raised, flat surface, an LED mounted on the raised, flat surface, an optical device optically coupled to the LED, and a support structure for connecting the optical device to the heat sink. The support structure further includes fixation spacers to connect the supporting structure to the heat sink, and both the LED and the fixation spacers contact the raised, flat surface on a common plane.

The heat sink may be a stamping formed from at least one of aluminum, an aluminum alloy, and a thermally conductive material. The pad surface may include an approximately circular area. The pad surface may have a thickness of at least 1.2 mm, or be in the range of approximately 1.2 mm to approximately 1.6 mm. The pad surface may include a truncated circular area. The optical device may be a light pipe, a collector lens or a collimator lens.

The support structure may further include at least one touch down peg, and the heat sink may further include a corresponding touch down hole for each of the at least one touch down peg. Where the optical device may is a light pipe, a lateral distance between the LED and each of the at least one touch down pegs is at least 10 mm. Where the optical device is a light pipe, a lateral distance between the LED and each of the at least one touch down pegs is at least equal to the distance of a first end of the light pipe to the LED. Each of the at least one touch down pegs may be self-centering within the corresponding touch down hole. The at least one touch down peg may include a cylindrical shape or a tapered shape along a length.

In another aspect of the invention, a method for assembling a lighting assembly includes forming a heat sink with a pad surface by stamping a blank, connecting an LED to the pad surface, and joining an optical device and a support structure. The support structure is connected to the pad surface of the heat sink, and the LED and the support structure are resting on the pad surface. A PCB is connected to the heat sink, the PCB resting on the heat sink at a location other than the pad surface. The PCB is electrically connected to the LED by at least one ribbon wire, and the optical device is positioned relative to the LED, the LED able to direct light into a first end of the optical device and out a second end of the optical device.

The support structure may be aligned with the heat sink by inserting at least one touch down peg of the support structure into a corresponding at least one touch down hole of the heat sink.

The step of connecting the support structure to the pad surface of the heat sink, the LED and the support structure resting on the pad surface further may include positioning a plurality of fixation spacers of the support structure on the pad surface with the LED.

The forming a heat sink with a pad surface includes stamping a blank of at least one of aluminum, an aluminum alloy, and a thermally conductive material. The forming a heat sink may include stamping a pad surface having a thickness in the range of approximately 1.2 mm to approximately 1.6 mm.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
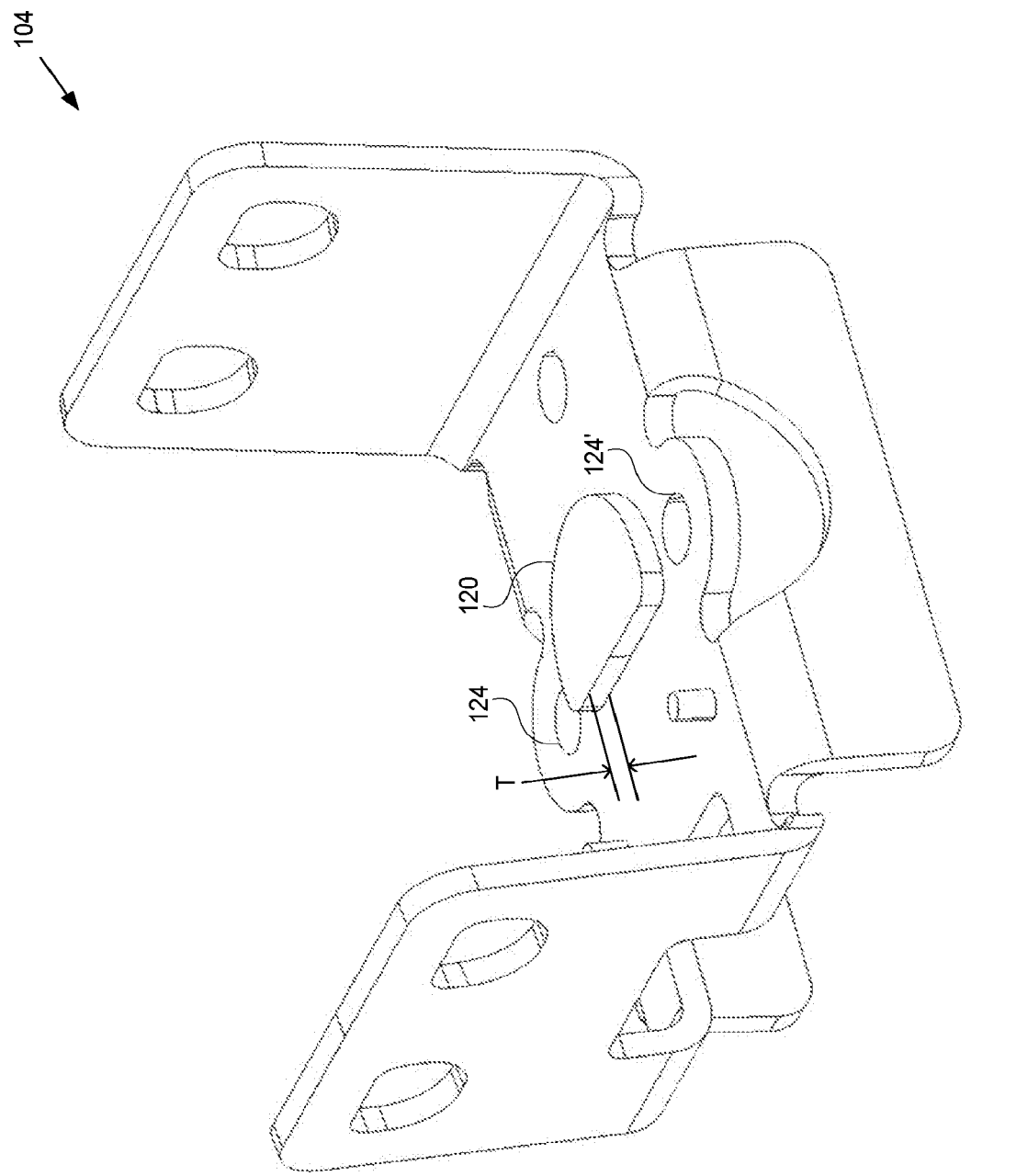
FIG. 1 illustrates a heat sink, according to one example.

Referring now to the drawings, wherein like reference numerals designate identical or corresponding parts throughout the several views. Further, as used herein, the words "a", "an" and the like generally carry a meaning of "one or more", unless stated otherwise.

FIG. 1 illustrates a heat sink 104, according to one example. The heat sink 104 may be formed as a stamping, including a raised, flat pad 120 of a thickness T, and a number of touch down holes 124, 124', etc. The pad 120 may be formed as a raised, flat surface on a flat portion of the heat sink 104, and the touch down holes 124 may be located adjacent to the pad 120. The pad 120 may be mechanically coupled to the heat sink, or formed by stamping a recess in an underside of the heat sink 104. The heat sink 104 may provide a lighting assembly 101 (see FIG. 2) with thermal capacity to store and dissipate excess heat generated by operation of the lighting assembly 101, particularly from an LED 102. While in one example, the heat sink 104 may be formed from stamped aluminum, it is understood that the heat sink 104 may be formed from a variety of materials that are thermally conductive and that can be stamped. In one example, the thickness T corresponds to a thickness of the PCB. This thickness may be approximately 1.2 to 1.6 mm.

In another example, the raised flat pad of heat sink 104 may be formed by stamping a mounting side to include a recess within which a Printed Circuit Board (PCB) 112 may be positioned, and allow for positioning of an LED 102 and a fixation assembly 108 on the non-recessed portion of the heat sink 104. This maintains the relative position (along a z-axis) between the LED 102, the fixation assembly 108 (illustrated in FIG. 3), and the PCB 112. In one example, the PCB 112 has a thickness of approximately 1.5 mm.

Figure 2:
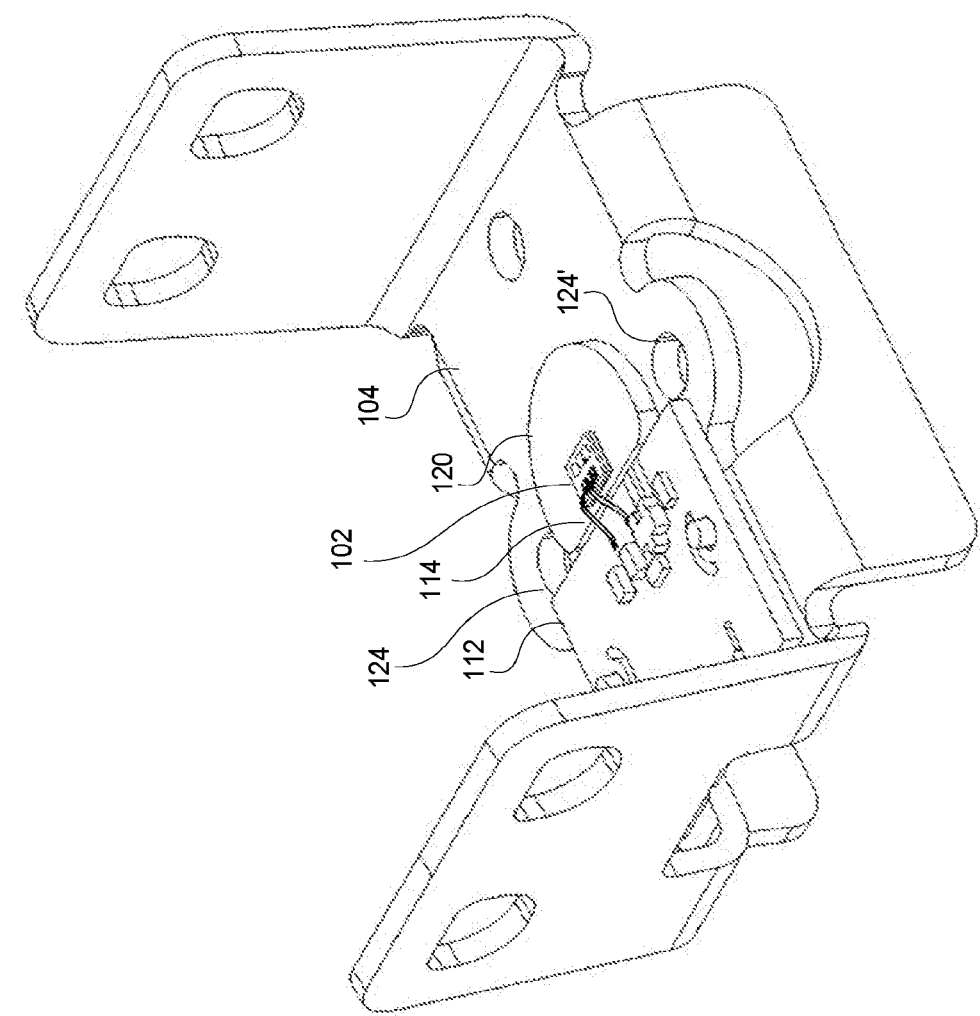
FIG. 2 illustrates a lighting assembly, according to one example.

FIG. 2 illustrates a lighting assembly 101, according to one example. The lighting assembly 101 is also shown without the fixation assembly 108 for illustrative purposes. The lighting assembly 101 may also include the heat sink 104, the PCB 112, the LED 102, and one or more conductive ribbons 114. The LED 102 may be positioned on the pad 120 of the heat sink 104, while the PCB 112 may be mounted on another portion of the heat sink 104 to maintain a distance from the LED 102 to protect the PCB 112 from heat generated by the LED 102, allowing the PCB 112 to maintain a lower temperature during operation of the LED 102. The ribbon 114 may electrically connect the LED 102 to the PCB 112, and the PCB 112 may be connected to and control operation of the LED 102.

Figure 3:
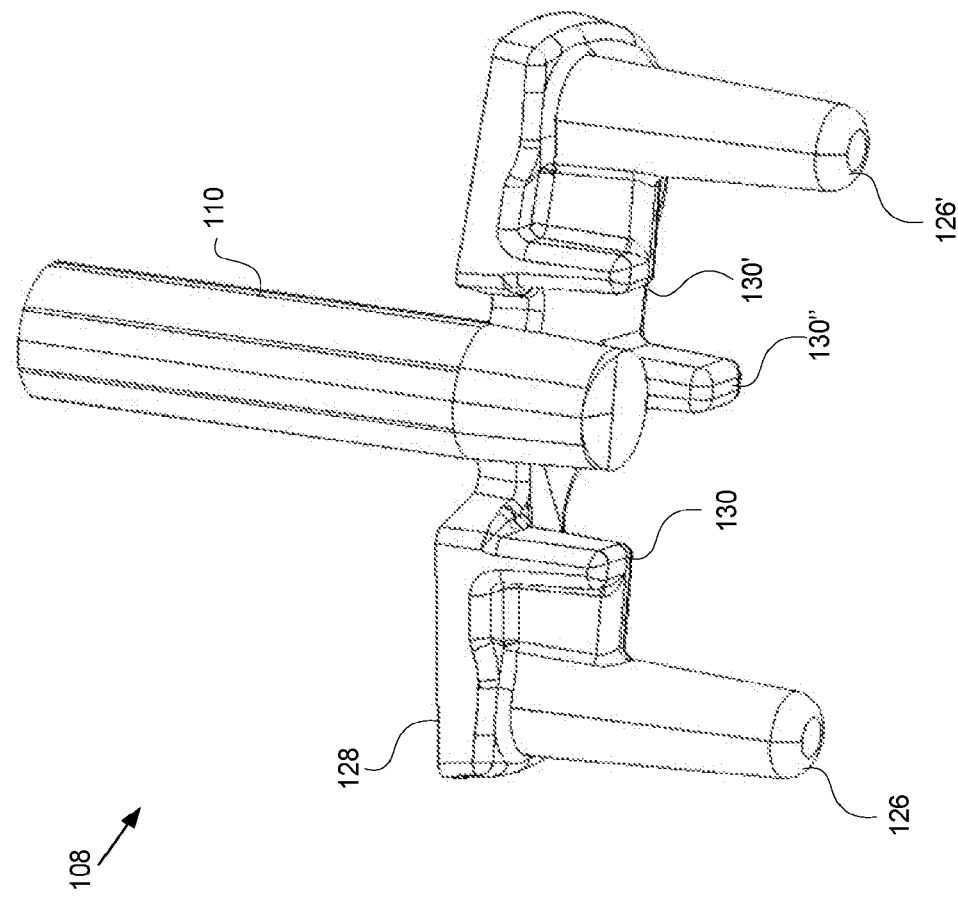
FIG. 3 illustrates the fixation assembly, according to one example.

It is generally desirable to form a pad 120 having as small an area as possible for ease of stamping. Thus, conventionally, the mounting pad area is formed slightly larger than the footprint of the LED 102. However, use of the fixation assembly 108 having one or more fixation spacers 130, such as illustrated by FIG. 3, may necessitate forming the pad 120 to include a larger area than just to accommodate positioning of the LED 102. In one example, the pad 120 may have a truncated circular shape or area to accommodate placement of the PCB 112 adjacent to the LED 102, such as shown in FIG. 2. One advantage of such a shape is to allow placement of the PCB 112 close to the LED 102, and therefore reduce the length of the ribbon 114. In another example, the pad 120 may have a circular shape or area.

FIG. 3 illustrates the fixation assembly 108, according to one example. The fixation assembly 108 may include a fixation body 128 connected to one or more touch down pegs 126, 126', etc., one or more fixation spacers 130, 130', 130", etc., and a light pipe 110 to be optically coupled to the LED 102. The touch down pegs 126 establish lateral spacing of the light pipe 110 with respect to LED 102, and the fixation spacers 130 establish axial distance (focus) of the LED with respect to light pipe 110. Axial distance should be as small as possible to improve optical coupling, but is constrained by the ability of the light pipe to withstand heat of the LED. The lateral distance should be kept as small as possible to minimize tolerance effects on the pad surface, but is also constrained by thermal tolerance of the fixation spacer material and may be centered about the location of the LED 102 on the pad 120. In general, the lateral distance of the fixation spacers 130 from the LED 102 should be at least equal to the vertical distance from the first end of the light pipe 110 to the LED 102 and is generally. In one example, the lateral distance of the fixation spacers 130 from the LED 102 is at least 10 mm.

In general, it is desirable for each of the touch down peg 126 to be located as far from the other touch down peg 126 as practicable to reduce the magnitude of possible rotation of the fixation assembly 108 relative to the heat sink 104 during assembly of the lighting assembly 101. In one example, the fixation assembly 108 may have two touch down pegs 126. In another example, the fixation assembly 108 may have three touch down pegs 126. Further, in one example the fixation assembly 108 may have three fixation spacers 130. In another example, the fixation assembly 108 may have two fixation spacers 130.

The fixation assembly 108 may be designed to connect to the heat sink 104 by insertion of one or more of the touch down pegs 126 into a corresponding number of the touch down holes 124 of the heat sink 104. As seen, the touch down holes 124 are not located on the pad 120. This spaces the holes from the LED to preserve thermal properties of the heat sink in the area surrounding the LED. In one embodiment the touch down holes 124 serve as a reference for placement of the LED 120 on the pad 120. The fixation assembly 108 may rest on the pad 120 by contact between the one or more fixation spacers 130 and the pad 120. The touch down peg 126 may be cylindrical in form. Further, the touch down peg 126 may be tapered along a longitudinal z-axis such that it may be self-centering in a case the touch down peg 126 is inserted into the touch down hole 124.

The light pipe 110 may be positioned in a substantially parallel direction relative to the touch down peg 126 and the fixation spacers 130 such that the light pipe 110 may be substantially perpendicular to the pad 120 when the fixation assembly 108 is connected to the heat sink 104. In other examples, the fixation assembly 108 may include other componentry rather than the light pipe 110 such as a collimator lens, a collector lens, or other optical element.

The fixation assembly 108 may be formed from one or more materials, such as polymethyl methacrylate (PMMA), acrylic, or acrylic glass having desired properties which may affect or be affected by constraints due to expected operating conditions such as temperature, vibration, and durability requirements, as well as requirements for manufacturing cost and repeatability, molding precision and accuracy, material cost and availability, and color.

Figure 4:
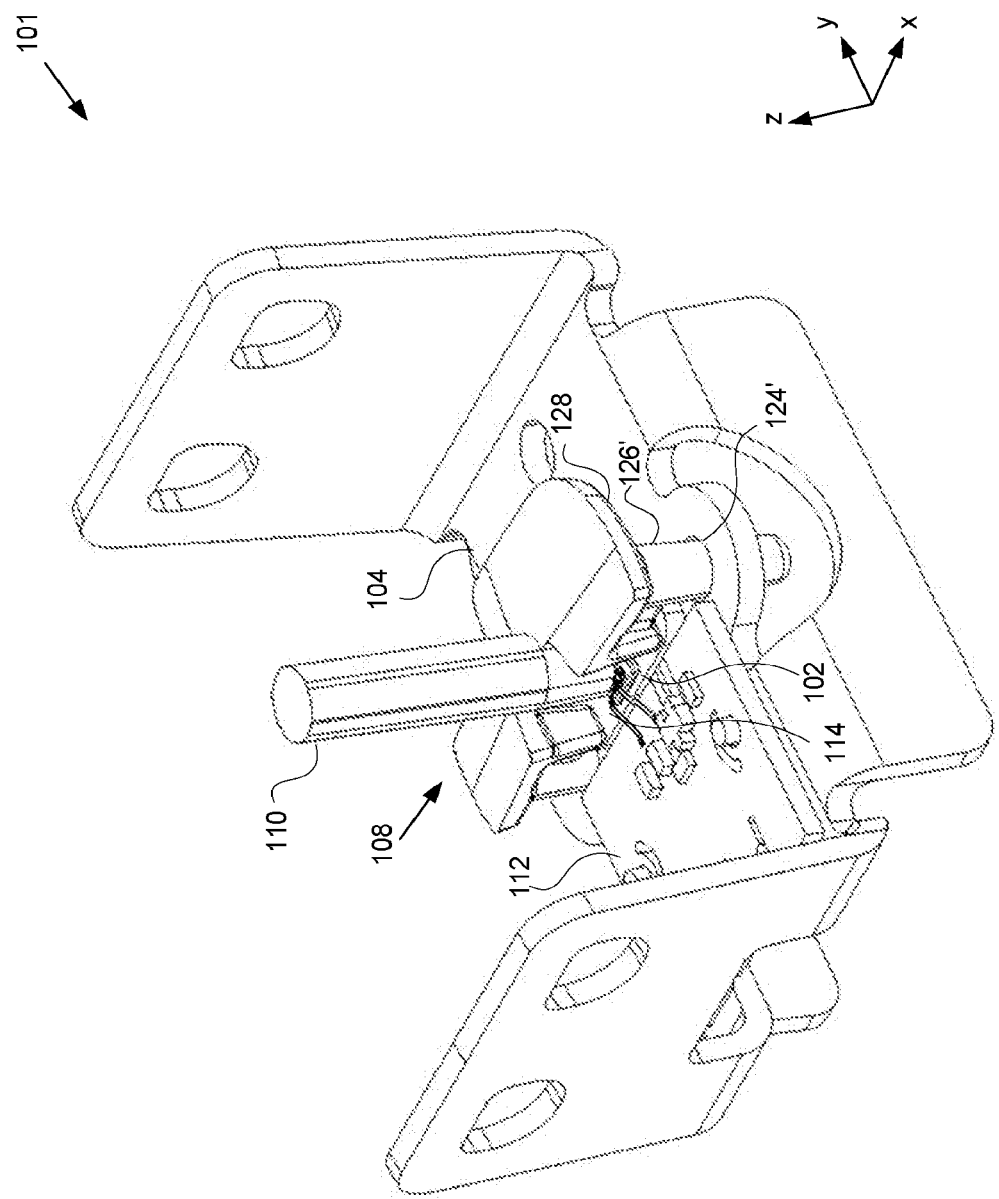
FIG. 4 illustrates the lighting assembly connected to the fixation assembly, according to one example.

FIG. 4 illustrates the lighting assembly 101 connected to the fixation assembly 108, according to one example. The fixation body 128 is connected to the heat sink 104 by the number of touch down pegs 126 connected to the fixation body 128 and inserted through a corresponding number of the touch down holes 124. Connections between the touch down holes 124 and the touch down pegs 126 restrict or prevent movement between the fixation body 128 and the heat sink 104 in the x-y plane, as well as allow the fixation body 128 to rest on the heat sink 104 in the vertical direction (z-axis). The fixation body 128 further rests on the pad 120 of the heat sink 104 through contact between one or more fixation spacers 130 and the pad 120. The PCB 112 may control operation of the LED 102 through the connection between the LED 102 and the PCB 112 by the number of ribbons 114.

Figure 5:
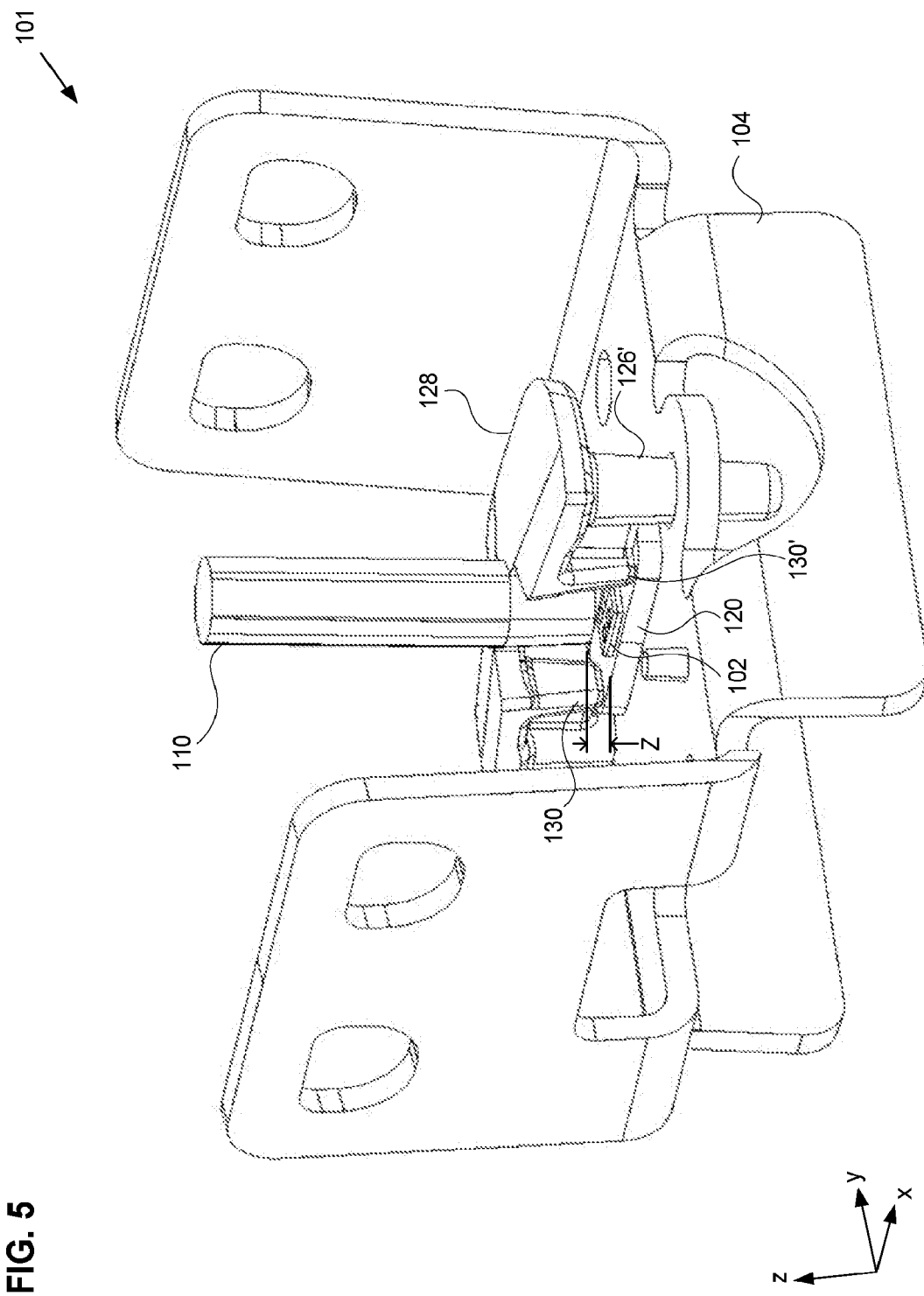
FIG. 5 illustrates the lighting assembly connected to the fixation assembly, according to one example.

FIG. 5 illustrates the lighting assembly 101 connected to the fixation assembly 108, according to one example. The lighting assembly 101 shown is identical to that illustrated by FIG. 4, with the exceptions that the lighting assembly 101 is shown from a different perspective and that the PCB 112 shown in FIG. 4 is omitted to indicate a vertical distance Z separating the first end of the light pipe 110 from the pad 120 and the LED 102.

Because the light pipe 110 is rigidly connected to the fixation body 128 that is secured to the heat sink 104, and the LED 102 is positioned on the pad 120 of the heat sink 104, the position of the light pipe 110 is thus fixed relative to the LED 102. The LED 102 may be positioned on the pad 120 near a first end of the light pipe 110. Light emitted by the LED 102 may be directed into the first end of the light pipe 110. The more the first end of the light pipe 110 encompasses the LED 102, the more light emitted by the LED 102 is captured by the light pipe 110. Through internal reflection along a length inside the light pipe 110, light emitted by the LED 102 may be directed through to a second end of the light pipe 110. The smaller the vertical distance Z between the first end of the light pipe 110 and the LED 102, the more efficient light transmission between the LED 102 through to the second end of the light pipe 110 may be (e.g. due to Total Internal Reflection, TIR). However, a constraint that limits placing the light pipe 110 directly around the LED 102 may be heat dissipation. Heat generated by the LED 102 may be detrimental to reliability and durability of the light pipe 110. Due to thermal considerations the light pipe 110 may thus be positioned the distance Z from the pad 120 to maintain a suitable distance between the LED 102 and the first end of the light pipe 110. In one example, distance Z may be approximately 0.2 mm. In another example, distance Z may be approximately in the range of 0.1 mm to 0.4 mm.

Precise positioning between the LED 102 and the light pipe 110 is of great importance to the performance of the lighting assembly 101. Locating both the LED 102 and the light pipe 110 (by way of the fixation body 128, and the fixation spacer 130) relative to the same reference surface or plane on the pad 120 allows for improved tolerances and repeatability during manufacturing and assembly of the lighting assembly 101. By positioning the LED 102 and supporting the fixation assembly 108 on the pad 120, the LED 102 and the fixation spacers 130 are thus resting on the same plane. This eliminates a tolerance that would otherwise exist between the LED 102 and the fixation spacers 130 if the LED 102 was mounted on a different plane to that of the fixation spacers 130. In that case there would exist a tolerance relative to the distance Z that would affect the positioning of the LED 102 relative to the fixation spacers 130. Further, it is beneficial that the pad 120 is formed as an integral part of the heat sink 104 by a stamping process. Stamping of the pad 120 results in a more planar surface than is available from sheet aluminum or another material prior to the stamping process, further improving accuracy of positioning between the LED 102, the fixation spacers 130, and the pad 120. In addition to stamping, the pad surface may be machined to improve flatness and therefore coupling between the LED and light pipe.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

What is claimed is:

1. A lighting assembly, comprising:
    a heat sink comprising a raised flat pad, the raised flat pad protruding from a flat portion of the heat sink;
    an LED mounted on the raised flat pad, the LED being in direct contact with the raised flat pad;
    an optical device optically coupled to the LED; and
    a support structure for connecting the optical device to the heat sink, wherein the support structure comprises fixation spacers to connect the support structure to the heat sink, and both the LED and the fixation spacers rest on the raised flat pad on a common plane,
    wherein:
        the support structure further comprises at least one touch down peg,
        the heat sink further comprises a corresponding touch down hole for each of the at least one touch down peg, and
        the corresponding touch down hole is positioned on a surface of the heat sink that is noncoplanar relative to the raised flat pad.

2. The lighting assembly according to claim 1, wherein the heat sink is a stamping formed from at least one of aluminum, an aluminum alloy, and a thermally conductive material.

3. The lighting assembly according to claim 1, wherein the raised flat pad comprises an approximately circular area.

4. The lighting assembly according to claim 1, wherein the raised flat pad comprises a thickness of at least 1.2 mm.

5. The lighting assembly according to claim 1, wherein the raised flat pad comprises a thickness in a range of approximately 1.2 mm to approximately 1.6 mm.

6. The lighting assembly according to claim 1, wherein the raised flat pad comprises a truncated circular shape.

7. The lighting assembly according to claim 1, wherein the optical device is a light pipe.

8. The lighting assembly according to claim 1, wherein the optical device is a collector lens.

9. The lighting assembly according to claim 1, wherein the optical device is a collimator lens.

10. The lighting assembly according to claim 1, wherein:
    the optical device is a light pipe, and
    a lateral distance between the LED and each of the at least one touch down pegs is at least 10 mm.

11. The lighting assembly according to claim 1, wherein:
    the optical device is a light pipe, and
    a lateral distance between the LED and each of the at least one touch down pegs is at least equal to a distance of a first end of the light pipe to the LED.

12. The lighting assembly according to claim 1, wherein each of the at least one touch down pegs is self-centering within the corresponding touch down hole.

13. The lighting assembly according to claim 1, wherein the at least one touch down peg comprises a cylindrical shape along a length.

14. The lighting assembly according to claim 1, wherein the at least one touch down peg comprises a tapered shape along a length.

15. A method for assembling a lighting assembly, comprising:
    forming a heat sink with a raised flat pad by stamping a blank, the raised flat pad protruding from a flat portion of the heat sink;
    connecting an LED to the raised flat pad;
    joining an optical device and a support structure;
    connecting the support structure to the raised flat pad of the heat sink, the LED and the support structure resting on the raised flat pad, the LED and the support structure being in direct contact with the raised flat pad;
    connecting a PCB to the heat sink, the PCB resting on the heat sink at a location other than the raised flat pad, the PCB and the raised flat pad being positioned side by side in the heatsink:

connecting the PCB electrically to the LED by at least one ribbon wire;

positioning the optical device relative to the LED, the LED able to direct light into a first end of the optical device and out a second end of the optical device; and aligning the support structure with the heat sink by inserting at least one touch down peg of the support structure into a corresponding at least one touch down hole of the heat sink positioned on the flat portion adjacent the raised flat pad.

16. The method of claim 15, wherein the step of connecting the support structure to the raised flat pad of the heat sink, the LED and the support structure resting on the raised flat pad further comprises positioning a plurality of fixation spacers of the support structure on the raised flat pad with the LED.

17. The method of claim 15, wherein said forming a heat sink with a raised flat pad by stamping a blank of at least one of aluminum, an aluminum alloy, and a thermally conductive material.

18. The method of claim 15, wherein said forming a heat sink comprises stamping a raised flat pad having a thickness in a range of approximately 1.2 mm to approximately 1.6 mm.

19. The lighting assembly according to claim 1, wherein each of the fixation spacers has a length that is less than a length of the at least one touch down peg.

* * * * *